US012622359B2

(12) United States Patent
Pastucha et al.

(10) Patent No.: US 12,622,359 B2
(45) Date of Patent: May 12, 2026

(54) SYSTEM AND METHOD FOR ASSISTED OR AUTOMATED CROP TRANSFER

(71) Applicant: AGCO International GmbH, Neuhausen (CH)

(72) Inventors: Elzbieta Pastucha, Randers (DK); Filip Slezák, Randers (DK); Martin Peter Christiansen, Randers (DK); Morten Stigaard Laursen, Randers (DK)

(73) Assignee: AGCO International GmbH, Neuhausen (CH)

( * ) Notice: Subject to any disclaimer, the term of this patent is extended or adjusted under 35 U.S.C. 154(b) by 194 days.

(21) Appl. No.: 18/487,863

(22) Filed: Oct. 16, 2023

(65) Prior Publication Data

US 2024/0130293 A1    Apr. 25, 2024
US 2024/0224874 A9    Jul. 11, 2024

Related U.S. Application Data

(60) Provisional application No. 63/418,542, filed on Oct. 23, 2022.

(51) Int. Cl.
*A01D 90/10*      (2006.01)
*A01D 41/127*      (2006.01)

(52) U.S. Cl.
CPC ........... *A01D 90/10* (2013.01); *A01D 41/127* (2013.01)

(58) Field of Classification Search
CPC .... A01D 41/127; A01D 43/087; A01D 90/10;

H04N 13/239; H04N 23/90; G06V 10/14; G06V 10/16; G06V 20/56; B60R 2300/105; B60R 2300/40; B60R 2300/80
See application file for complete search history.

(56) References Cited

U.S. PATENT DOCUMENTS

| | | | |
|---|---|---|---|
| 6,943,824 B2 | 9/2005 | Alexia et al. | |
| 9,861,040 B2 | 1/2018 | Bonefas | |
| 2010/0063692 A1 | 3/2010 | Madsen et al. | |
| 2011/0170534 A1* | 7/2011 | York | H04J 3/0667 |
| | | | 702/89 |
| 2013/0287122 A1* | 10/2013 | Mizosoe | H04N 21/2365 |
| | | | 375/240.26 |

(Continued)

FOREIGN PATENT DOCUMENTS

| | | | |
|---|---|---|---|
| DE | 102010041870 A1 | 4/2012 | |
| EP | 3915353 A1 * | 12/2021 | A01D 43/073 |

OTHER PUBLICATIONS

UK Intellectual Property Office, Search report for related UK Application No. GB2216317.4, dated Apr. 24, 2023, 3 pages.

*Primary Examiner* — Michael A Lyons

(57) ABSTRACT

A harvester includes a crop processor for reducing crop material to processed crop, a crop transfer arm for transferring processed crop material to a receiving vehicle, and a vision system including a first camera having a first field of view and a second camera having a second field of view, wherein the first camera is separated from the second camera along two axes. A control system is configured to use image data from the first camera and image data from the second camera to detect the presence of a receiving vehicle and to determine a distance between the harvester and the receiving vehicle, and generate control signals for automatically aligning the crop transfer arm with the receiving vehicle.

17 Claims, 13 Drawing Sheets

(56)        References Cited

U.S. PATENT DOCUMENTS

| | | | |
|---|---|---|---|
| 2015/0189832 A1* | 7/2015 | Krause .............. | A01D 41/1217 |
| | | | 414/809 |
| 2022/0022376 A1* | 1/2022 | Bohrer ................. | A01D 90/02 |
| 2022/0095539 A1 | 3/2022 | Faust et al. | |
| 2023/0148475 A1* | 5/2023 | Reed ................. | A01D 41/1217 |
| | | | 414/469 |

* cited by examiner

24

28

SYSTEM AND METHOD FOR ASSISTED OR AUTOMATED CROP TRANSFER

FIELD

Embodiments of the present invention relate to systems and methods for automated or assisted synchronization of agricultural machine operations. More particularly, embodiments of the present invention relate to systems and methods for automated or assisted synchronization of machine movement during transfer of crop material from one machine to another.

BACKGROUND

Combine harvesters are used in agricultural production to cut or pick up crops such as wheat, corn, beans and milo from a field and process the crop to remove grain from stalks, leaves and other material other than grain (MOG). Processing the crop involves gathering the crop into a crop processor, threshing the crop to loosen the grain from the MOG, separating the grain from the MOG and cleaning the grain. The combine harvester stores the clean grain in a clean grain tank and discharges the MOG from the harvester onto the field. The cleaned grain remains in the clean grain tank until it is transferred out of the tank through an unload conveyor into a receiving vehicle, such as a grain truck or a grain wagon pulled by a tractor.

To avoid frequent stops during a harvesting operation it is common to unload the grain from a harvester while the combine harvester is in motion harvesting crop. Unloading the harvester while it is in motion requires a receiving vehicle to drive alongside the combine harvester during the unload operation. This requires the operator driving the receiving vehicle to align a grain bin of the receiving vehicle with the spout of an unload conveyor of the combine for the duration of the unload operation. Aligning the two vehicles in this manner is laborious for the operator of the receiving vehicle and, in some situations, can be particularly challenging. Some circumstances may limit the operator's visibility, for example, such as where there is excessive dust in the air or at nighttime. Furthermore, if the receiving vehicle has a large or elongated grain bin, such as a large grain cart or a grain truck, it is desirable to shift the position of the grain bin relative to the spout during the unload operation to evenly fill the grain bin and avoid spilling grain. The operator of the receiving vehicle cannot see into the bin of the receiving vehicle from the operator's cabin and, therefore, must estimate the fill pattern of the receiving vehicle during the fill process and shift the position of the grain bin accordingly to try to fill the receiving vehicle evenly.

Forage harvesters also process crop but function differently from combine harvesters. Rather than separating grain from MOG, forage harvesters chop the entire plant—including grain and MOG—into small pieces for storage and feeding to livestock. Forage harvesters do not store the processed crop onboard the harvester during the harvest operation, but rather transfer the processed crop to a receiving vehicle by blowing the crop material through a discharge chute to the receiving vehicle, such as a silage wagon pulled by a tractor, without storing it on the harvester. Thus, a receiving vehicle must closely follow the forage harvester during the entire harvester operation. This presents similar challenges to those discussed above in relation to the combine harvester.

The above section provides background information related to the present disclosure which is not necessarily prior art.

SUMMARY

A harvester according to an embodiment includes a crop processor for reducing crop material to processed crop; a crop transfer arm for transferring processed crop material to a receiving vehicle; a vision system including a first camera having a first field of view, and a second camera having a second field of view, wherein the first camera is separated from the second camera along two axes; and a control system configured to use image data from the first camera and image data from the second camera to detect the presence of a receiving vehicle and to determine a distance between the harvester and the receiving vehicle, and generate control signals for automatically aligning the crop transfer arm with the receiving vehicle.

This summary is provided to introduce a selection of concepts in a simplified form that are further described in the detailed description below. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF DRAWINGS

Embodiments of the present invention are described in detail below with reference to the attached drawing figures, wherein.

Figure 1:
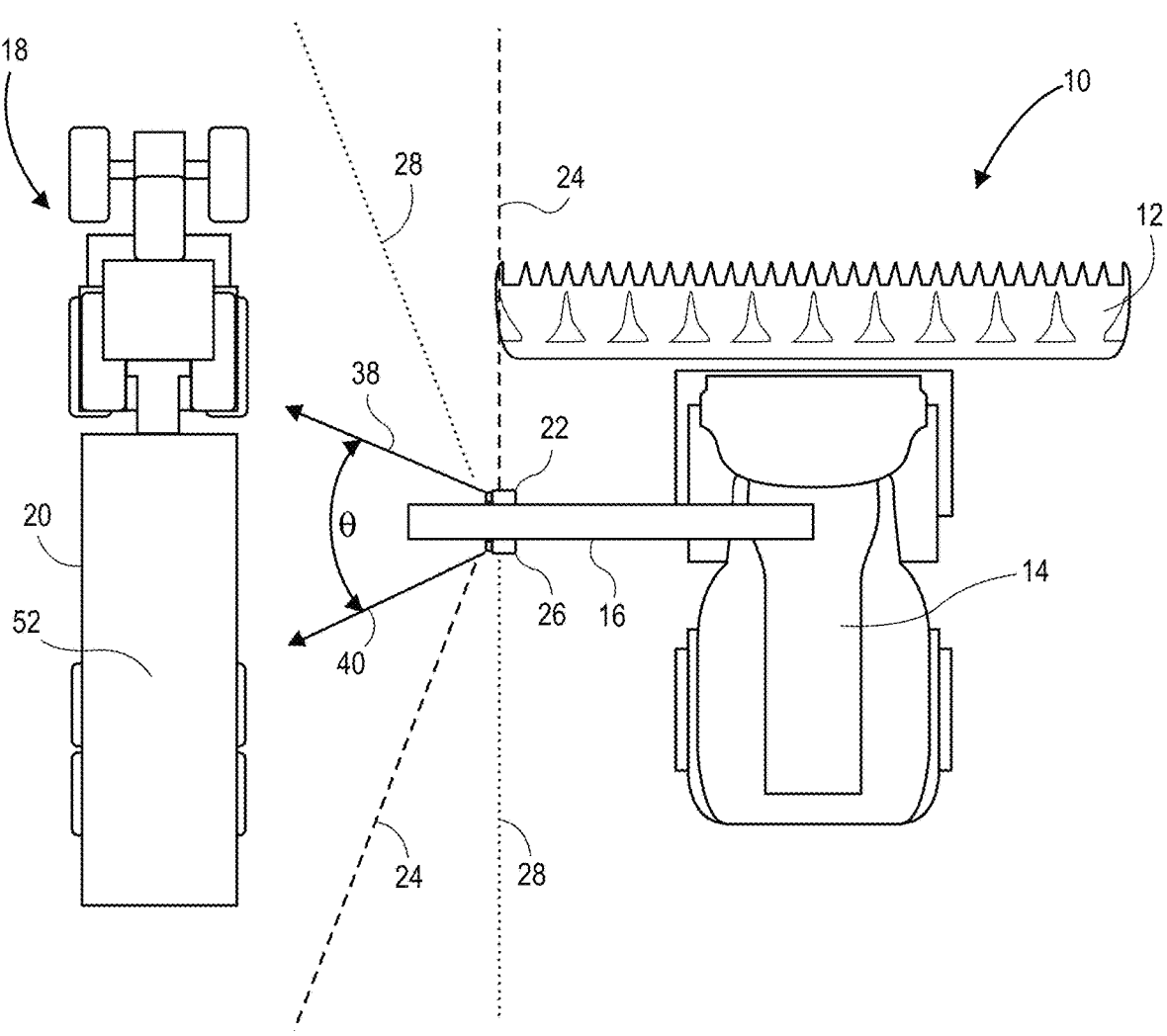
FIG. 1 illustrates a harvester and a receiving vehicle, the harvester including a vision system in accordance with an embodiment of the invention.

The drawing figures do not limit the present invention to the specific embodiments disclosed and described herein. The drawings are not necessarily to scale, emphasis instead being placed upon clearly illustrating the principles of the invention.

DESCRIPTION

The following detailed description of embodiments of the invention references the accompanying drawings. The embodiments are intended to describe aspects of the invention in sufficient detail to enable those skilled in the art to practice the invention. Other embodiments can be utilized and changes can be made without departing from the spirit and scope of the invention as defined by the claims. The following description is, therefore, not to be taken in a limiting sense. Further, it will be appreciated that the claims are not necessarily limited to the particular embodiments set out in this description.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

When elements or components are referred to herein as being "connected" or "coupled," the elements or components may be directly connected or coupled together or one or more intervening elements or components may also be present. In contrast, when elements or components are referred to as being "directly connected" or "directly coupled," there are no intervening elements or components present.

According to an embodiment of the invention a harvester includes a crop processor for reducing crop material to processed crop, a crop transfer arm for transferring processed crop material to a receiving vehicle, and a vision system. The vision system includes a first camera on a first side of the crop transfer arm and having a first field of view of at least one hundred and forty degrees, and a second camera on a second side of the crop transfer arm opposite the first side and having a second field of view of at least one hundred and forty degrees. The first camera is separate from the second camera by a distance of at least twenty centimeters. A first portion of the first field of view overlaps at least a portion of the second field of view and a second portion of the first field of view does not overlap the second field of view, and a first portion of the second field of view overlaps at least a portion of the first field of view and a second portion of the second field of view does not overlap the first field of view.

A control system is configured to combine image data from the first camera and the second camera to form a single two-dimensional image, identify the receiving vehicle in the single two-dimensional image, combine image data from the first camera and the second camera to form a stereo image, and use the stereo image to determine a location of the receiving vehicle relative to the harvester.

Turning now to the drawing figures, and initially FIG. 1, a harvester including a crop transfer assistance system constructed in accordance with embodiments of the invention is illustrated. A forage harvester 10 includes a header 12 for cutting and collecting crop material from a field, a crop processor 14 for reducing crop material to processed crop, and a transfer arm 16 for transferring processed crop material to a receiving vehicle 18. The receiving vehicle 18 includes a silage wagon 20 pulled by a tractor that operates in the vicinity of the harvester 10 so that harvested silage blown through the transfer arm 16 is collected in the silage wagon 20. A bin 52 of the silage wagon 20 receives and holds crop material transferred from the harvester 10 via the crop transfer arm 16.

A vision system on the harvester 10 includes a first camera 22 having a first field of view 24 of at least one hundred and forty degrees and a second camera 26 having a second field of view 28 of at least one hundred and forty degrees. As illustrated in FIG. 1, the first camera 22 is positioned on a first side of the crop transfer arm 16 and the second camera 26 is positioned on a second side of the crop transfer arm 16. The first field of view 24 and the second field of view 28 include at least an area near the harvester 10 where the receiving vehicle 18 is positioned when crop is transferred from the harvester 10 to the receiving vehicle 18 through the crop transfer arm 16.

Figure 2:
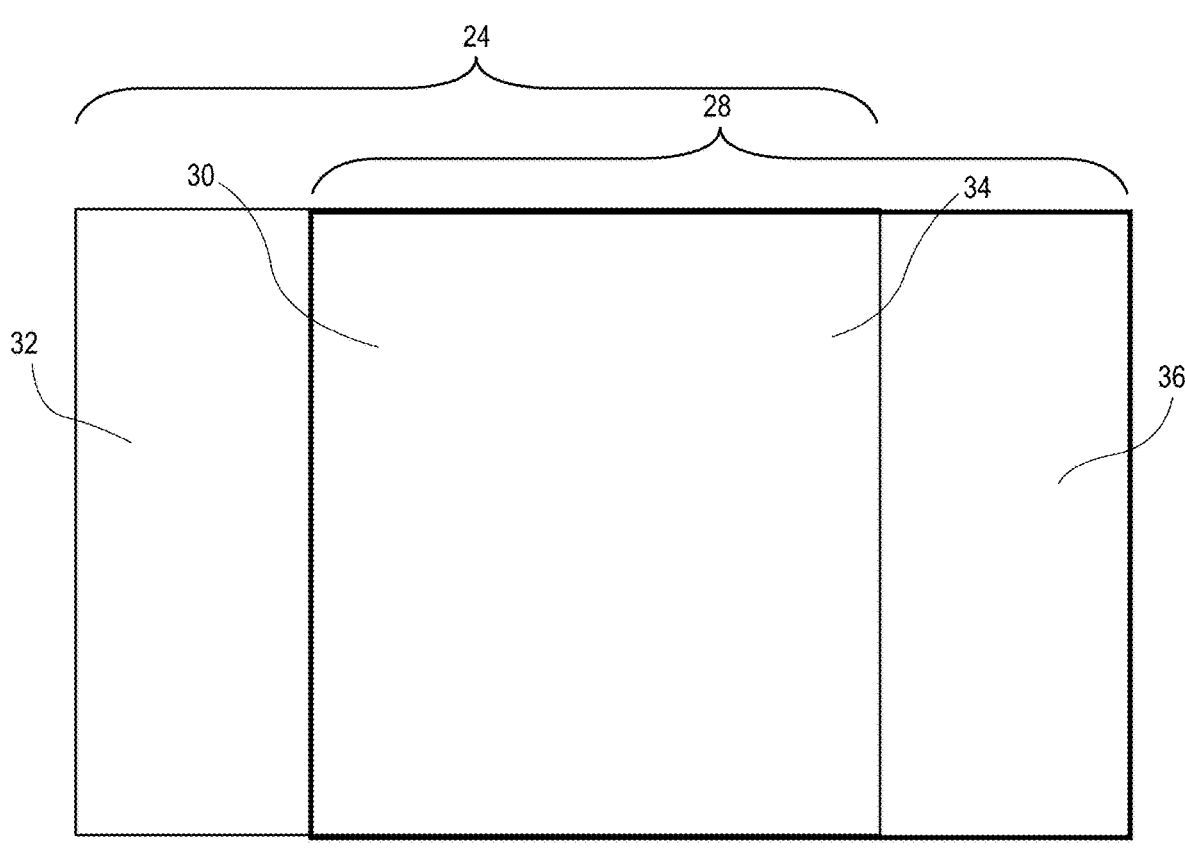
FIG. 2 illustrates overlapping fields of view of cameras forming part of the vision system of FIG. 1.

Referring also to FIG. 2, which illustrates the first field of view 24 and the second field of view 28 from the perspective of the cameras 22, 26, a first portion 30 of the first field of view 24 overlaps a portion of the second field of view 28 and a second portion 32 of the first field of view does not overlap the second field of view 28. A first portion 34 of the second field of view 28 overlaps at least a portion of the first field of view 24 and a second portion 36 of the second field of view 28 does not overlap the first field of view 24. A center 38 of the first field of view 24 and a center 40 of the second field of view 28 are angled outwardly from one another such that they form an angle θ of at least ten degrees.

As mentioned above each of the first 24 and second 28 fields of view is at least one hundred and forty degrees. It will be understood that the first field of view 24 and the second field of view 28 each may be greater than one hundred and forty degrees, such as where each field of view is at least one hundred and sixty degrees or at least one hundred and eighty degrees. Furthermore, it will be understood that the first camera 22 and the second camera 26 may be positioned such that the center 38 of the first field of view 24 and the center 40 of the second field of view 28 form an angle θ of zero or more degrees. In some embodiments the angle θ is zero such that the center 38 of the first field of view 24 and the center 40 of the second field of view 28 are parallel. In other embodiments the cameras 22, 26 are configured so that the fields of view 24 and 28 are angled away from one another such that the angle θ is greater than zero. By way of example and not limitation, the angle θ may be five degrees, ten degrees, fifteen degrees, twenty degrees or twenty five degrees.

The wide fields of view of the cameras 22, 26 and their position on the crop transfer arm 16 enables the partial overlapping of the fields of view described above and as illustrated in FIGS. 1 and 2. This configuration presents advantages over existing technology. By way of example the wide, overlapping fields of view generate image data that may be combined to form a large, two-dimensional image that is larger than an image generated by either camera 22, 26 alone and that corresponds to a 180-degree (or more) field of view. This large field of view may be used to identify the receiving vehicle in the image even if the receiving vehicle is located forward or rearward relative to the vision system. The large, combined image corresponds to portions 32, 30, 34 and 36 in FIG. 2. The overlapping image data (portions 30 and 34 in FIG. 2) may also be used as a stereo image to determine the depth of objects in the image. In this manner the image data from the first camera 22 and the second camera 26 may be used in two-dimensional form to identify the receiving vehicle 18 and determine the position of the receiving vehicle 18 forward or rearward relative to the harvester 10 (left or right in the image data). The image data may also be used in three-dimensional (stereo) form to determine a distance between the harvester 10 and the receiving vehicle 18 (the depth of the receiving vehicle 18 in the image data).

Figure 3:
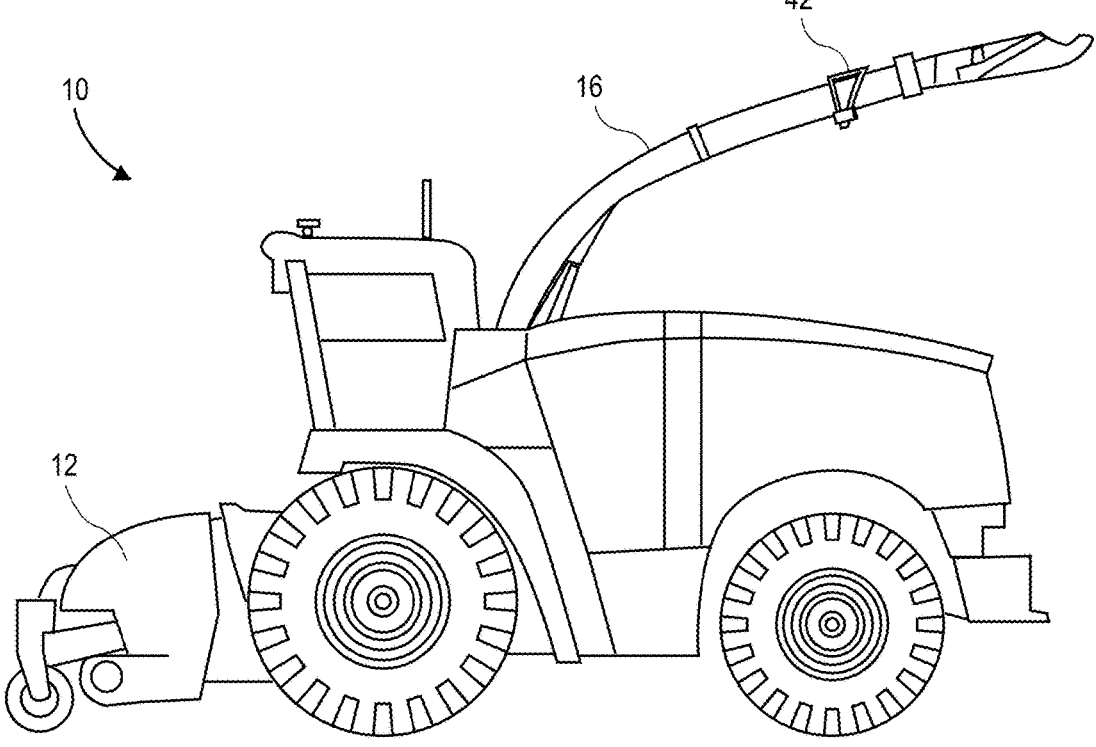
FIG. 3 is a side elevation view of the harvester of FIG. 1.
Figure 4:
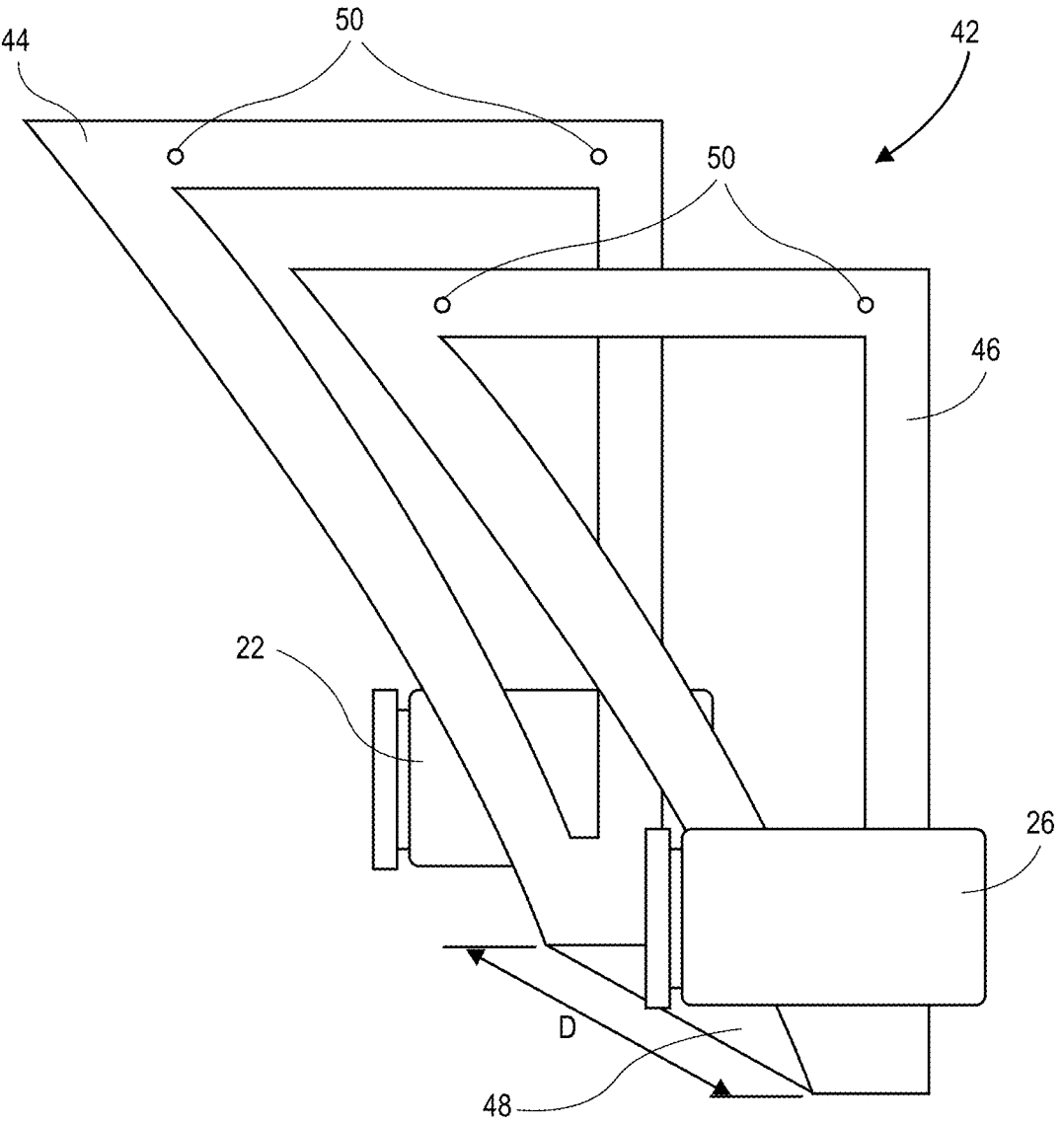
FIG. 4 is a perspective view of a mounting assembly forming part of the vision system of FIG. 1.

With particular reference to FIGS. 3 and 4, the first camera 22 and the second camera 26 are mounted on the crop transfer arm 16 by means of a mounting assembly 42. The mounting assembly 42 includes a first side bracket 44 configured to be positioned on a first side of the crop transfer arm 16, a second side bracket 46 configured to be positioned on a second side of the crop transfer arm 16, and a cross member 48 connecting the first side bracket 44 and the second side bracket 46. The first camera 22 is coupled with the first side bracket 44 and the second camera 26 is coupled with the second side bracket 46. Thus, the first camera 22 is mounted on a first side of the crop transfer arm 16 and the second camera 26 is mounted on a second side of the crop transfer arm 16, the second side being opposite the first side. The first camera 22 and the second camera 26 are separated by a distance D corresponding to at least the width of the crop transfer arm 16. In some embodiments, the distance of separation D is at least twenty centimeters.

The mounting assembly 42 is moveably coupled with the crop transfer arm 16 using bolts or similar fasteners that engage a series of holes 50 in the side brackets 44, 46. A user may loosen a nut, remove the assembly 42 from the bolt, and reattach the assembly to another bolt or set of bolts on the crop transfer arm 16 at a different location. In this manner the assembly 42 is moveable between multiple, discrete locations on the crop transfer arm 16. As explained in greater detail below, a control system is calibrated to use the first camera 22 and the second camera 26 when the mounting assembly 42 is positioned at each of the discrete mounting locations.

Figure 5:
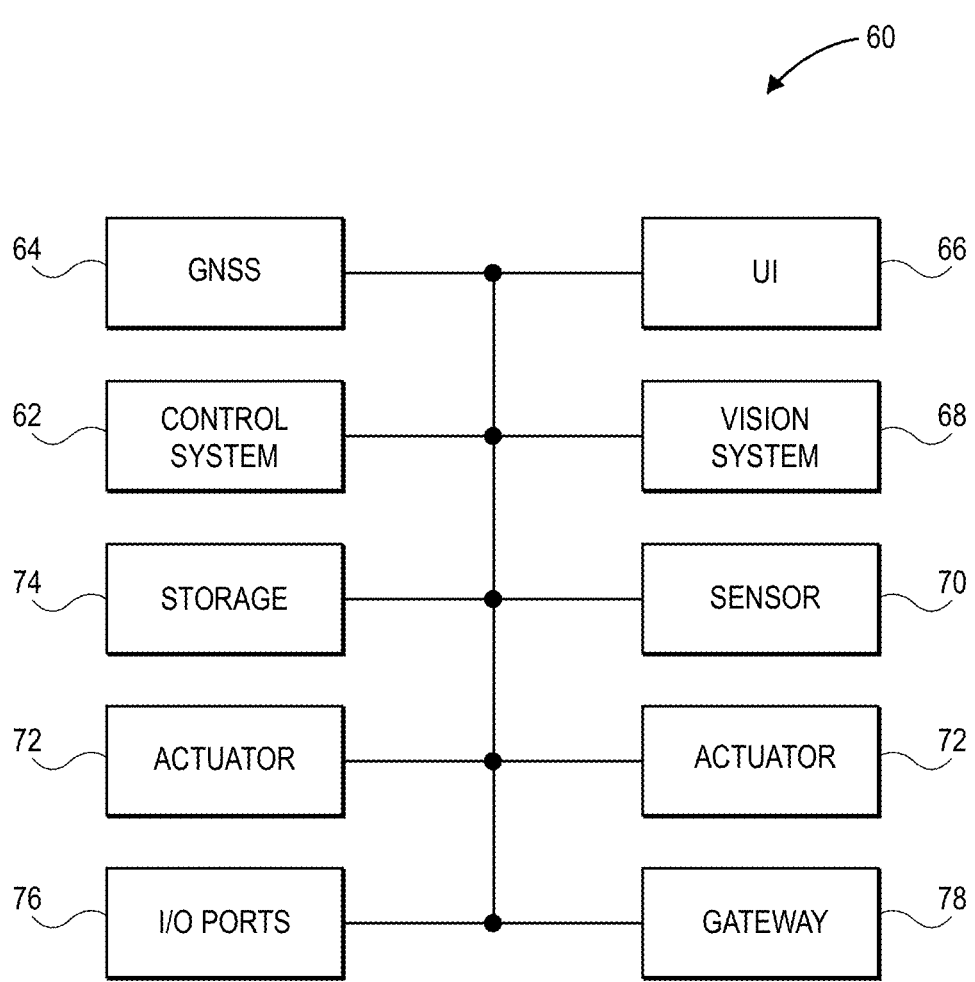
FIG. 5 is a block diagram of an electronic system of the harvester of FIG. 1.

The harvester includes an electronic system 60 as illustrated in FIG. 5. The system 60 broadly includes a control system 62, a position determining device 64, a user interface 66, a vision system 68, one or more sensors 70, one or more actuators 72, one or more storage components 74, one or more input/out ports 76 and a communications gateway 78.

The position determining device 64 may include a global navigation satellite system (GNSS) receiver, such as a device configured to receive signals from one or more positioning systems such as the United States' global positioning system (GPS), the European GALILEO system and/or the Russian GLONASS system, and to determine a location of the machine using the received signals. The user interface 66 includes components for receiving information, instructions or other input from a user and may include buttons, switches, dials, and microphones, as well as components for presenting information or data to users, such as displays, light-emitting diodes, audio speakers and so forth. The user interface 66 may include one or more touchscreen displays capable of presenting visual representations of information or data and receiving instructions or input from the user via a single display surface.

The one or more sensors 70 may be associated with any of various components or functions of the harvester 10 including, for example, various elements of the engine, transmission(s), wheels and hydraulic and electrical systems. One or more of the sensors 70 may be configured and placed to detect a position of the crop transfer arm 16. The one or more actuators 72 are configured and placed to drive certain functions of the machine including, for example, steering when an automated guidance function is engaged or positioning the crop transfer arm 16 to align the arm 16 with the receiving vehicle 18 during a crop transfer operation. The one or more actuators 72 may take virtually any form but are generally configured to receive control signals or instructions from the control system 62 (or other component of the system 60) and to generate a mechanical movement or action in response to the control signals or instructions. By way of example, the sensors 70 and actuators 72 may be used in automated steering of the harvester 10 wherein the sensors 70 detect a current position or state of steered wheels or tracks and the actuators 72 drive steering action or operation of the wheels or tracks. In another example, one or more of the sensors 70 collect data relating to the position of the crop transfer arm 16 and one or more of the actuators drive movement of the arm 16 to align the arm with the receiving vehicle 18 during a crop transfer operation, as explained below.

The control system 62 includes one or more computing devices programmed or configured to implement the functions described herein. By way of example the control system 62 may include one or more general purpose microprocessors or microcontrollers, programmable logic devices, or application specific integrated circuits. The control system 62 may include multiple computing components placed in various different locations on the harvester 10. The control system 62 may also include one or more discrete and/or analog circuit components operating in conjunction with the one or more integrated circuits or computing components. Furthermore, the control system 62 may include or have access to one or more memory elements operable to store executable instructions, data, or both. The storage component 74 stores data and preferably includes a non-volatile storage medium such as optic, magnetic or solid state technology digital storage technology.

The communications gateway 78 includes one or more wireless transceivers configured to communicate with external machines or devices using wireless communications technology. The communications gateway 78 may include one or more wireless transceivers configured to communicate according to one or more wireless communications protocols or standards, such as one or more protocols based on the IEEE 802.11 family of standards ("Wi-Fi"), the Bluetooth wireless communications standard, a 433 MHz wireless communications protocol or a protocol for communicating over a cellular telephone network. Alternatively or additionally, the communications gateway 78 may include one or more wireless transceivers configured to communicate according to one or more proprietary or non-standardized wireless communication technologies or protocols, such as proprietary wireless communications protocols using 2.4 GHz or 5 GHz radio signals. Thus, the communications gateway 78 enables wireless communications with other machines such as receiving vehicles or other harvesters or tractors, with external devices such as laptop or tablet computers or smartphones, and with external communications networks such as a cellular telephone network or Wi-Fi network.

It will be appreciated that, for simplicity, certain elements and components of the system 60 have been omitted from the present discussion and from the drawing of FIG. 5. A power source or power connector is also associated with the system, for example, but is conventional in nature and, therefore, is not discussed herein.

In some embodiments, all of the components of the system 60 are contained on or in a single host machine, such as the harvester 10. The present invention is not so limited, however, and in other embodiments one or more of the components of the system 60 may be external to the machine. In one embodiment, for example, some of the components of the system 60 are contained on or in a host machine while other components of the system 60 are contained on or in an implement associated with the host machine. In that embodiment, the components associated with the machine and the components associated with the implement may communicate via wired or wireless communications according to a local area network such as, for example, a controller area network. The system 60 may be part of a communications and control system conforming to the ISO 11783 (also referred to as "ISOBUS") standard. In yet another embodiment, one or more components of the system 60 may be located remotely from the machine and any implements associated with the machine. In that embodiment, the system 60 may include wireless communications components (e.g., the gateway) for enabling the machine to communicate with a remote computer, computer network or system. It may be desirable, for example, to use one or more computing devices external to the machine to determine, or assist in determining, a preferred travel path for collecting a plurality of bales, as explained herein.

Figure 6:
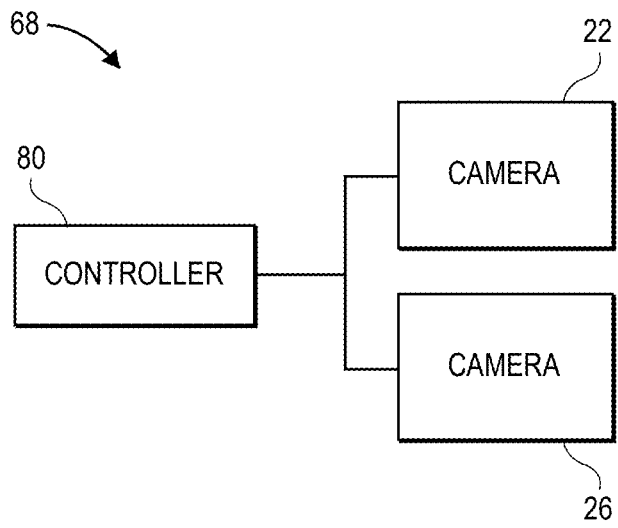
FIG. 6 is a block diagram of certain components of the vision system of FIG. 1.

FIG. 6 illustrates a block diagram of certain components of the vision system 68 including the first camera 22, the second camera 26 and a controller 80. The controller 80 will be described herein as being separate from the control system 62, described above, with the understanding that the controller 80 may be part of the control system 62. The controller 80 receives image data from the first camera 22 and the second camera 26 and uses the image data to determine a location of the receiving vehicle 18 relative to the harvester 10.

In some embodiments the controller 80 uses a software-based clock synchronization protocol to synchronize operation of the first camera 22 and the second camera 26. More particularly, in these embodiments the controller 80, the first camera 22 and the second camera 26 form a local area network that implements the precision time protocol according to the IEEE 1588 standard.

The controller 80 uses the image data to identify the receiving vehicle 18 and determine a location of the receiving vehicle 18 relative to the harvester 10. The control system 62 may use the location of the receiving vehicle 18 relative to the harvester 10 to control a subsystem of the harvester 10 to align the crop transfer arm 16 with the receiving vehicle 18. Alternatively or additionally, the control system 62 may communicate the location of the receiving vehicle 18 relative to the harvester 10 to another machine, such as the receiving vehicle 18, or to an operator via a user interface such as the user interface 66 described above.

The controller 80 uses the image data to identify the receiving vehicle 18 and determine a location of the receiving vehicle 18 relative to the harvester 10. To identify the receiving vehicle 18 the controller 80 combines image data from the first camera 22 and the second camera 26 to form a single, large two-dimensional image such as by combining portions 30, 32, 34 and 36 in FIG. 2. This combined two-dimensional image may be a 180-degree panoramic image, as illustrated in FIG. 1, or may be larger than 180 degrees depending on the nature of the cameras 22, 26 and their positioning on the assembly 42. The controller 80 identifies the presence of the receiving vehicle 18 in the combined two-dimensional image by identifying one or more features of the receiving vehicle 18 in the image. To identify the one or more features of the receiving vehicle in the image the controller 80 may use a neural network implementing a model generated through a machine learning processes. To create a single two-dimensional image from two images taken from cameras with different points of view it may be necessary to perform a conversion on at least one of the images to resolve differences in the images due to their different points of view, as explained below.

Once the controller 80 identifies the receiving vehicle in the combined two-dimensional image it determines two-dimensional location information relating to the receiving vehicle 18. The two-dimensional location information includes a position of the receiving vehicle 18 toward the left or the right in the image, which corresponds to the receiving vehicle 18 being behind the harvester 10 (to the left in the image) or in front of the harvester 10 (to the right in the image) relative to the direction of travel of the harvester 10.

The controller 80 determines a distance between the harvester 10 and the receiving vehicle 18 by combining the overlapping portions of the image data generated by the first camera 22 and the second camera 26 (for example, portions 30 and 34 in FIG. 2) to form a stereo image. Using the stereo image the controller 80 determines a depth of features of the receiving vehicle 18 in the image data or, in other words, a separation distance between the cameras 22, 26 and the receiving vehicle 18 using, for example, triangulation of the two viewpoints. With the two-dimensional location information and the depth information collected from the stereo image, the controller 80 can determine the location of the receiving vehicle 18 and, more particularly, the location of the wagon 20, relative to the crop transfer arm 16.

With the relative position of the receiving vehicle 18 the control system 62 can automate, or assist with, alignment of the crop transfer arm 16 with the receiving vehicle 18. The harvester 10 may automatically align the crop transfer arm 16 with the bin 52 of the receiving vehicle 18 by operating a subsystem of the harvester 10. This may be done by controlling the propulsion system of the harvester 10 to adjust the ground speed of the harvester 10, or by controlling operation of the crop transfer arm 16 to pivot the arm 16 relative to the harvester 10 or to adjust a speed at which crop is moved through the arm 16 and, therefore, the trajectory the crop stream follows as it leaves the end of the crop transfer arm 16. Alternatively or additionally, the control system 62 may communicate the position of the receiving vehicle 18 relative to the harvester 10 to an operator, such as an operator of the harvester 10, via the user interface 66, described above. If the operator is manually aligning the crop transfer arm 16 with the bin 52 of the receiving vehicle 18 this information would assist the operator. Alternatively or additionally, the control system 62 may communicate the position of the receiving vehicle 18 relative to the harvester 10 to another machine, such as the receiving vehicle 18. The control system 62 would communicate this information to the receiving vehicle 18 via the gateway 78. Communicating this information to the receiving vehicle 18 would enable a control system 62 of the receiving vehicle 18 to automatically adjust operations (for example, propulsion, steering or both) of the receiving vehicle 18 to align the bin 52 with the crop transfer arm 16 or would enable the control system of the receiving vehicle 18 to assist the operator of the receiving vehicle 18 by presenting the relative position information to the operator via a user interface.

Figure 14:
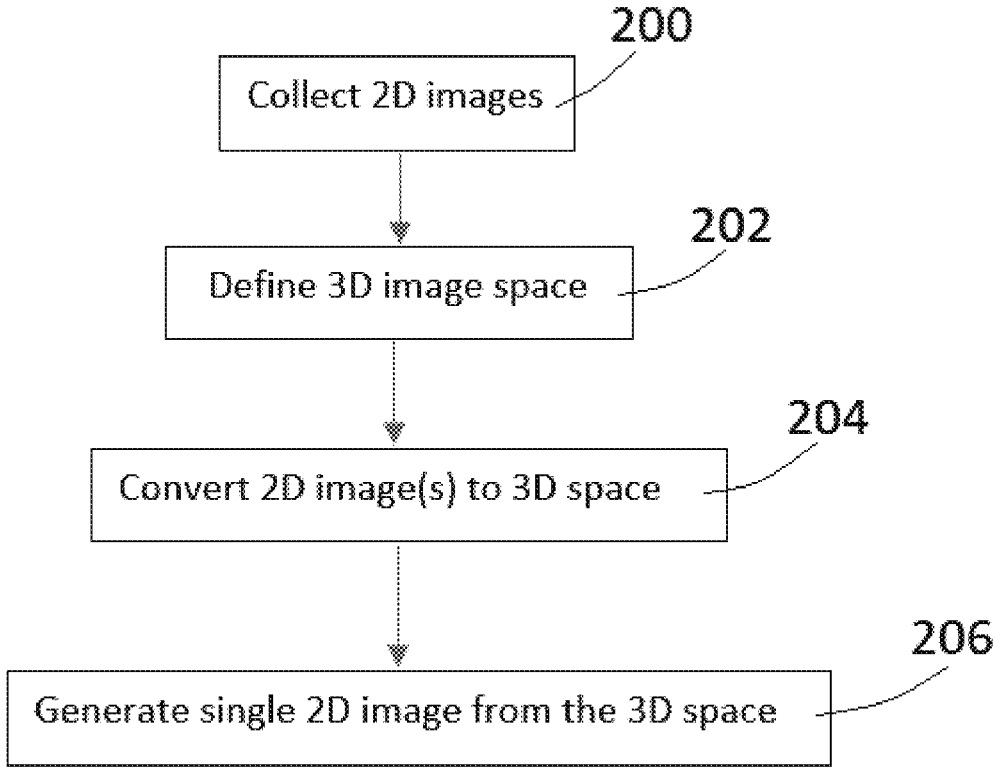
FIG. 14 is a flow diagram illustrating a method of combining two two-dimensional images to generating a single two-dimensional.

To create a single two-dimensional image from two images taken from cameras with different points of view, as described above, it may be necessary to perform a conversion on at least one of the images to resolve differences in the images due to their differing points of view. An exemplary method of performing a conversion is illustrated in FIG. 14. In a first step the two-dimensional images are generated, as depicted in block 200. This step may be performed when the images are collected by the cameras 22, 26. The three-dimensional image space in which the images were generated is defined, as depicted in block 202. This step involves defining the three-dimensional surfaces of the objects depicted in the two-dimensional images, and may be done using the stereo image of overlapping portions of the images, such as the portions 30 and 34 of images 24 and 28 illustrated in FIG. 2. It may also be desirable to define the three-dimensional images space corresponding to portions 32 and 36 that are not overlapping and, therefore, are not prat of the stereo image. To define the three-dimensional space in these portions the space may be estimated by extrapolating the three-dimensional space corresponding to the portions 30 and 34. Once the three-dimensional image space is defined, at least one of the two-dimensional images is converted to the three-dimensional space, as depicted in block 204. This step is performed by mathematically projecting each pixel of the image onto the surfaces of the three-dimensional space. The final step in the method involves generating a single two-dimensional image using the three-dimensional space, as depicted in block 206.

One exemplary application of the method illustrated in FIG. 14 involves capturing images using each of the cameras 22 and 26. Because the cameras are separated by a space that is approximately the width of the transfer arm 16 they will have different points of view. The combined two dimensional image may be generated using a first image corresponding to the first field of view 24 augmented by a second image corresponding to the second field of view 28. To augment the first image the overlapping portions 30, 34 are used to define the three-dimensional space (including predicting the three-dimensional space corresponding to the non-overlapping portion 36) and the pixels from the second image corresponding to the field of view 28 are mathematically projected onto the three-dimensional space. Then a single two-dimensional image is generated by adding the pixels from the second image to the first image by projecting where the pixels would be located in the first image using the three-dimensional space and the point of view of the first camera 22 relative to the three-dimensional space.

To determine the precise location of the receiving vehicle 18 relative to the crop transfer arm 16 the controller 80 must be calibrated with the location of the cameras 22, 26 on the harvester 10. The mounting assembly 42 is movably attached to the crop transfer arm 16, as explained above, therefore the controller 80 is configured to determine (or to receive from an operator) a location of the mounting assembly 42 on the arm 16 and apply the appropriate calibration corresponding to the particular location. Thus, the mounting assembly 42 is calibrated for use at each of the possible mounting locations. An operator may indicate a current location of the mounting assembly 42 via the user interface 66, or the controller 80 may determine the current location using a mounting assembly position sensor 82, as illustrated in the embodiment depicted in FIG. 6. Alternatively, the controller may be configured to automatically determine a location of the mounting assembly 68 from image data collected by the cameras 22, 26, such as where the image data includes a different, unique portion of the crop transfer arm 16 at each of the different mounting locations.

Figure 7:
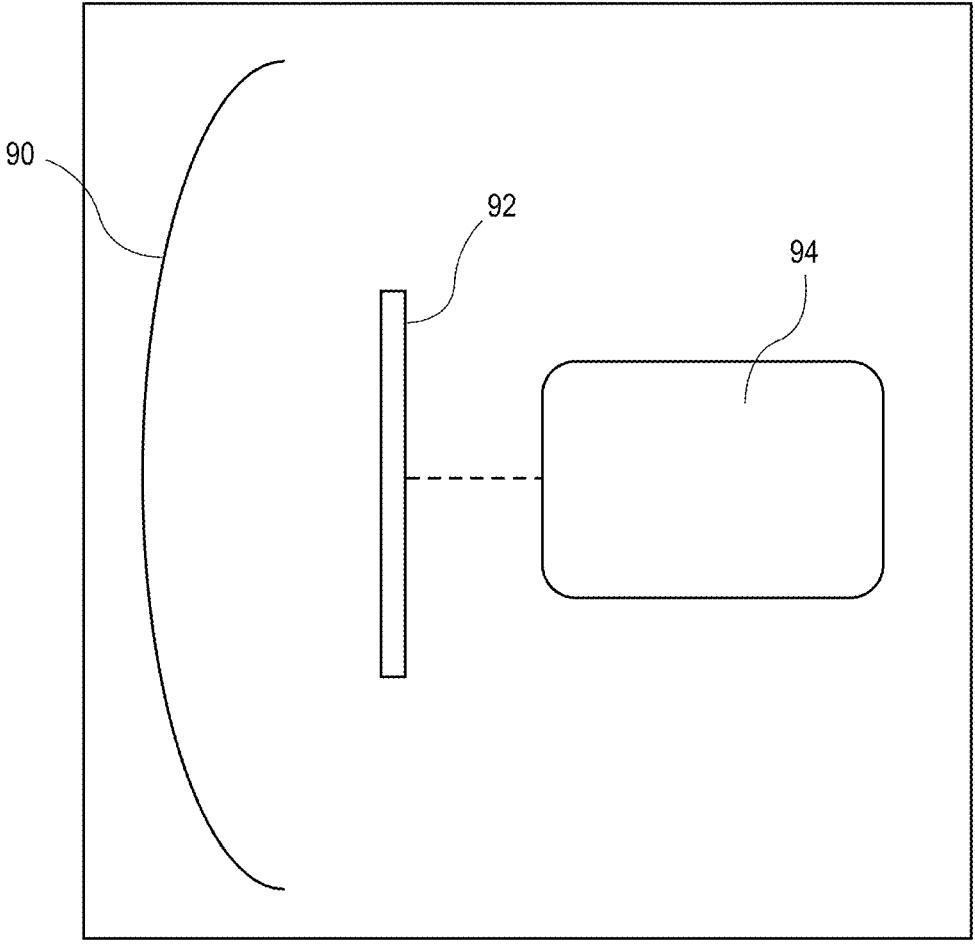
FIG. 7 is a diagram illustrating certain components of a camera with a fisheye lens.

The first camera 22 and the second camera 26 may each include a fisheye lens. A fisheye lens is a wide-angle lens that produces strong visual distortion and that is intended to create a wide panoramic or hemispherical image. Fisheye lenses are capable of capturing extremely wide fields of view, well beyond rectilinear lenses. Instead of producing images with straight lines of perspective (rectilinear images), fisheye lenses use a special mapping that results in images with a convex appearance. Certain components of an exemplary camera with a fisheye lens is illustrated in FIG. 7. The lens 90 presents a curve profile and an image sensor 92 collects light passing through and deflected by the lens 90. Software 94 may be used to transform the image data into a rectilinear image (one with straight perspective lines).

In some embodiments of the invention the first camera 22 and the second camera 26 are separated along one axis, while in other embodiments they are separated along two axes. When reference is made to separating the cameras along one axis or two axes, the axis or axes correspond to a frame of reference defined by the field of view 24 of the first camera 22. A first axis may be the horizontal axis of the frame of reference and a second axis may be the vertical axis of the frame of reference.

Figure 8:
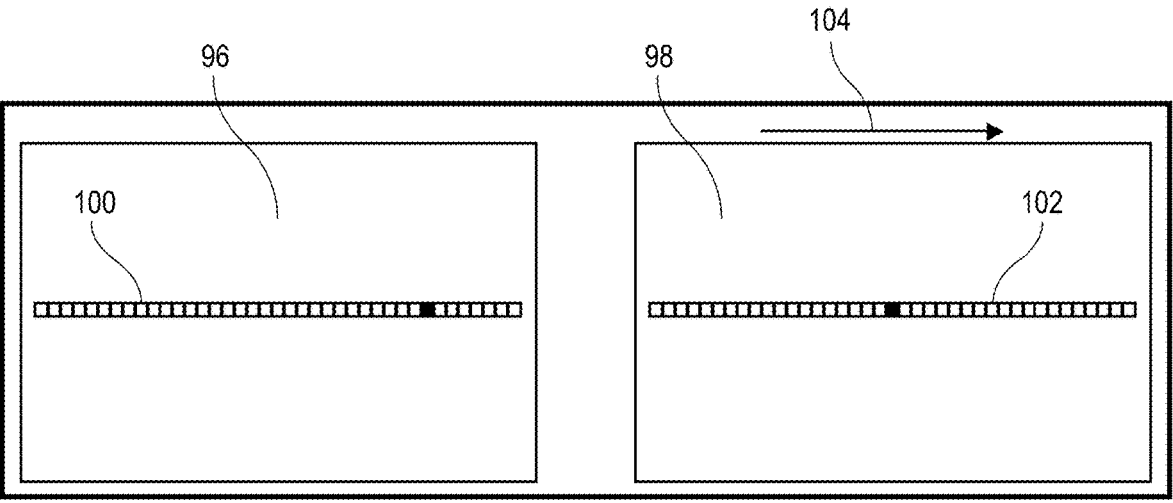
FIG. 8 illustrates portions of images taken by cameras of the vision system of FIG. 1 illustrating the effects of separating the cameras along a single axis.

FIG. 8 illustrates a scenario wherein the cameras 22, 26 are separated along a single axis. A portion of a first image 96 captured by the first camera 22 is presented on the left and a portion of a second image 98 taken by the second camera 26 is presented on the right. The portion of the first image 96 corresponds to the portion of the second image 98 or, in other words, they are both taken from the same section or pixels of the captured image (for example, the top right of each image, the bottom left of each image, the center of each image, etcetera). An exemplary row of pixels 100 is included in the portion of the first image 96 and a corresponding row of pixels 102 is included in the portion of the second image 98, such that both rows of pixels correspond to the same object or objects in the field of view. As illustrated, the row of pixels 102 in the portion of the second image 98 is shifted leftward relative to the same row 100 in the portion of the first image 96 because the second camera 26 is shifted rightward relative to the first camera 22 as indicated by arrow 104. In other words, the second camera 26 is separated from the first camera 22 in the direction of the arrow 104 such that corresponding rows of pixels in the two images are parallel and at the same vertical location in the image—the only difference is the shift in pixels in the horizontal direction.

Figure 9:
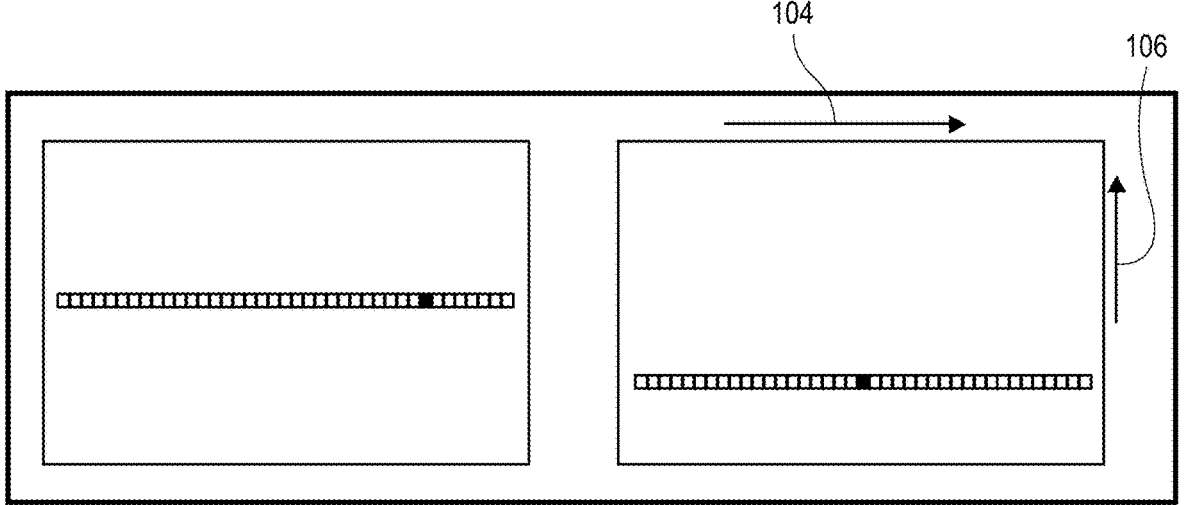
FIG. 9 illustrates portions of images taken by cameras of the vision system of FIG. 1 illustrating the effects of separating the cameras along two axes.

FIG. 9 illustrates a scenario wherein the cameras 22, 26 are separated along two axes. As in the scenario illustrated in FIG. 8 the second camera 26 is shifted rightward relative to the first camera 22 in the direction of the arrow 104, but in the scenario illustrated in FIG. 9 the second camera 26 is also shifted upward relative to the first camera 22 in the direction of the arrow 106. The second camera 26 is separated from the first camera 22 in the direction of the arrows 104, 106 such that corresponding rows of pixels in the two images are parallel but shifted vertically (along arrow 104) and shifted horizontally (along arrow 106). Shifting the cameras 22, 26 along two axes can be beneficial in some situations such as where reference features in the images present an elongate, horizontal shape. In the embodiment illustrated in FIG. 9 the cameras 22, 26 are separated along two orthogonal axes as the axis represented by arrow 104 and the axis represented by arrow 106 form a ninety-degree angle.

Figure 10:
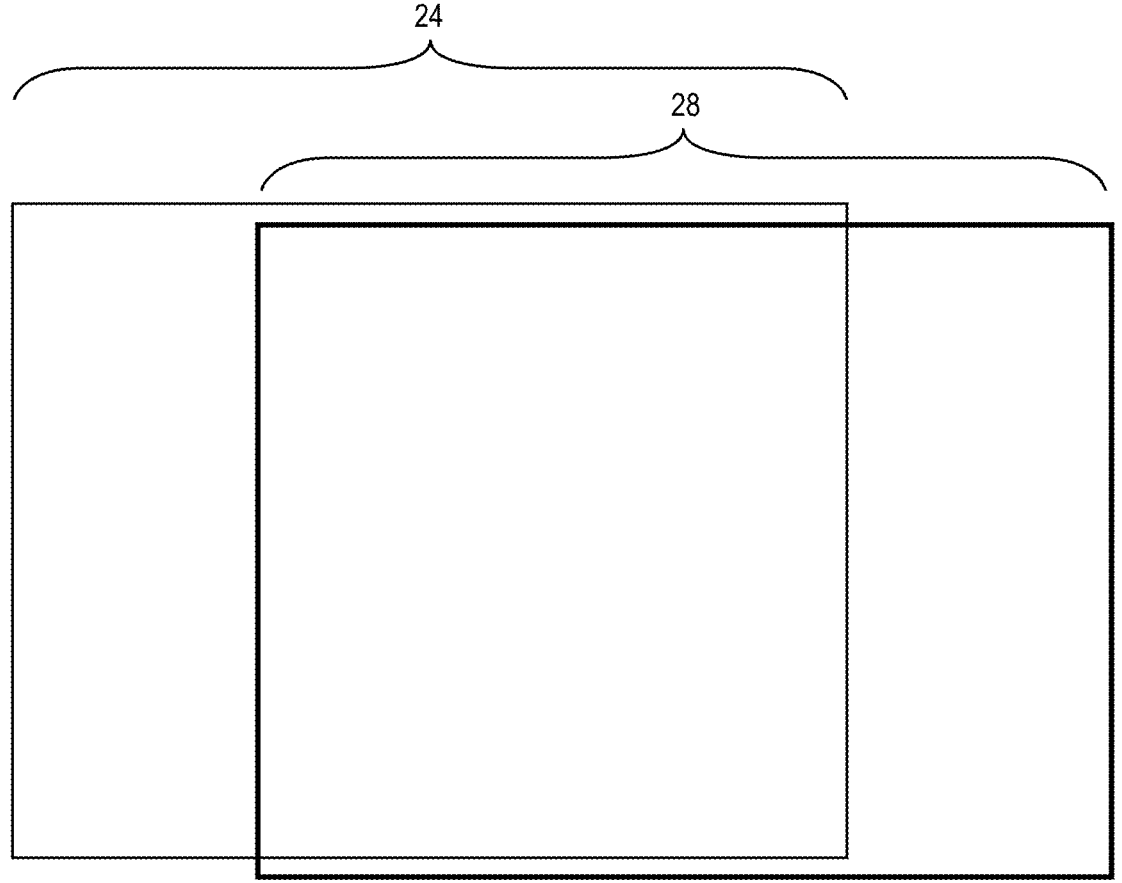
FIG. 10 illustrates overlapping fields of view of cameras forming part of the vision system of FIG. 1, wherein the cameras are separated along two axes.
Figure 11:
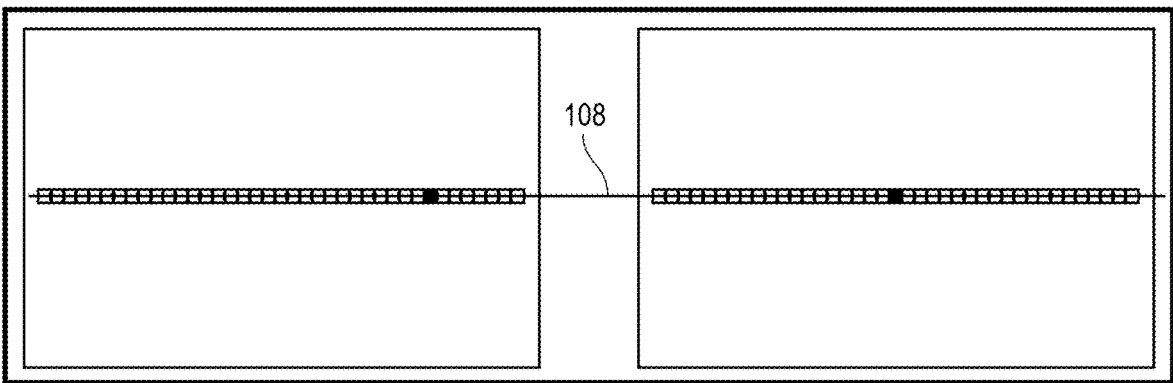
FIG. 11 illustrates an epipolar line used in stereo image processing when the cameras are separated along a single axis.
Figure 12:
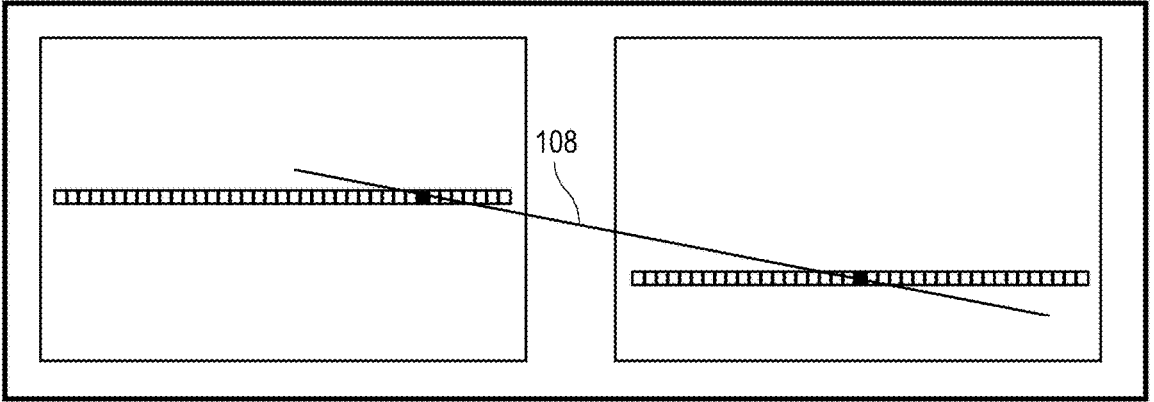
FIG. 12 illustrates an epipolar line used in stereo image processing when the cameras are separated along two axes.
Figure 13:
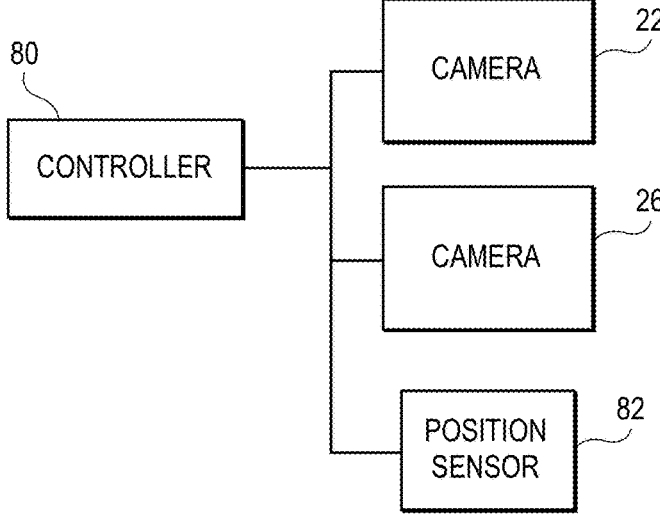
FIG. 13 is a block diagram of certain components of another embodiment of the vision system of FIG. 1.

When the first camera 22 and the second camera 26 are separated along two axes the fields of view are shifted in a manner similar to that illustrated in FIG. 10. This can make the three-dimensional depth determination using stereo vision simpler and more reliable. When the cameras are separated along only the horizontal axis, for example, an epipolar line 108 used in three-dimensional analysis is parallel with horizontally-oriented object in the images as illustrated in FIG. 11. When the cameras 22, 26 are separated along two axes, the epipolar line 108 is no longer parallel with the object, as illustrated in FIG. 12. This difference facilitates the three-dimensional analysis and reduces the likelihood of error because it is easier to identify the differences in locations of the pixels in the different images.

Figure 15:
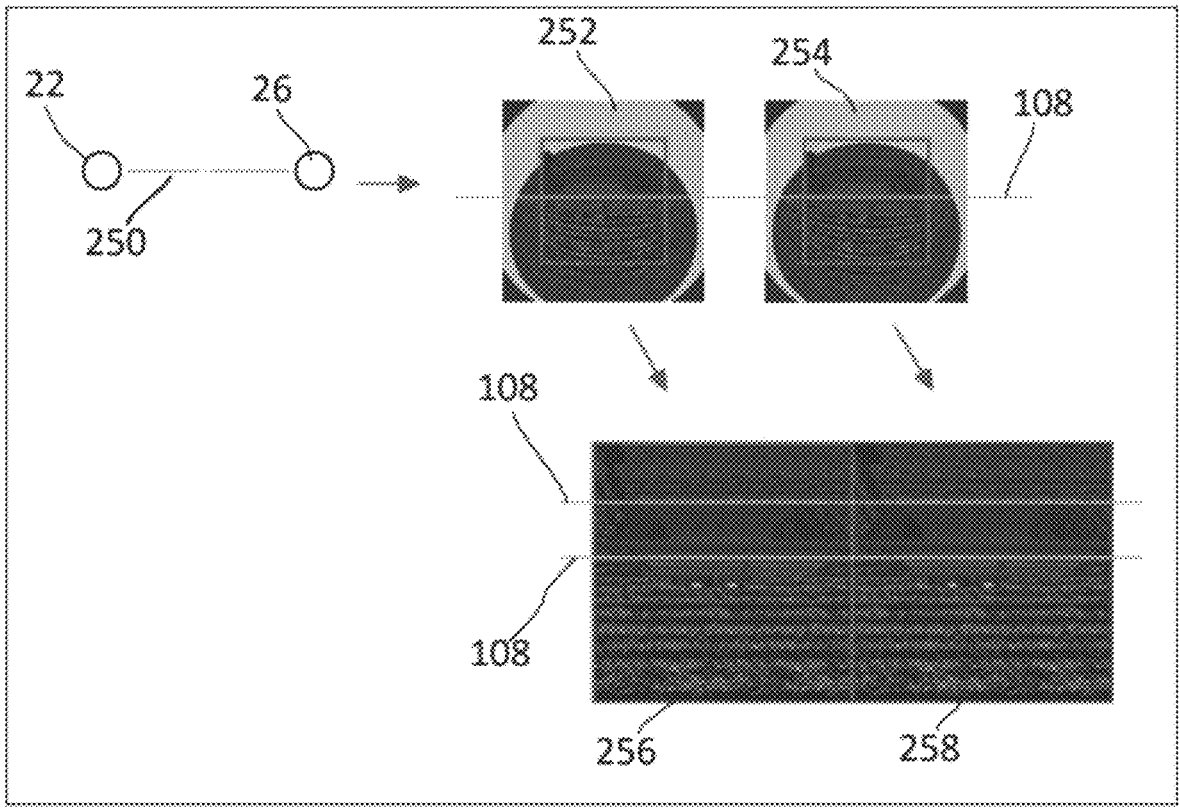
FIG. 15 illustrates images taken from cameras separated along a single axis.
Figure 16:
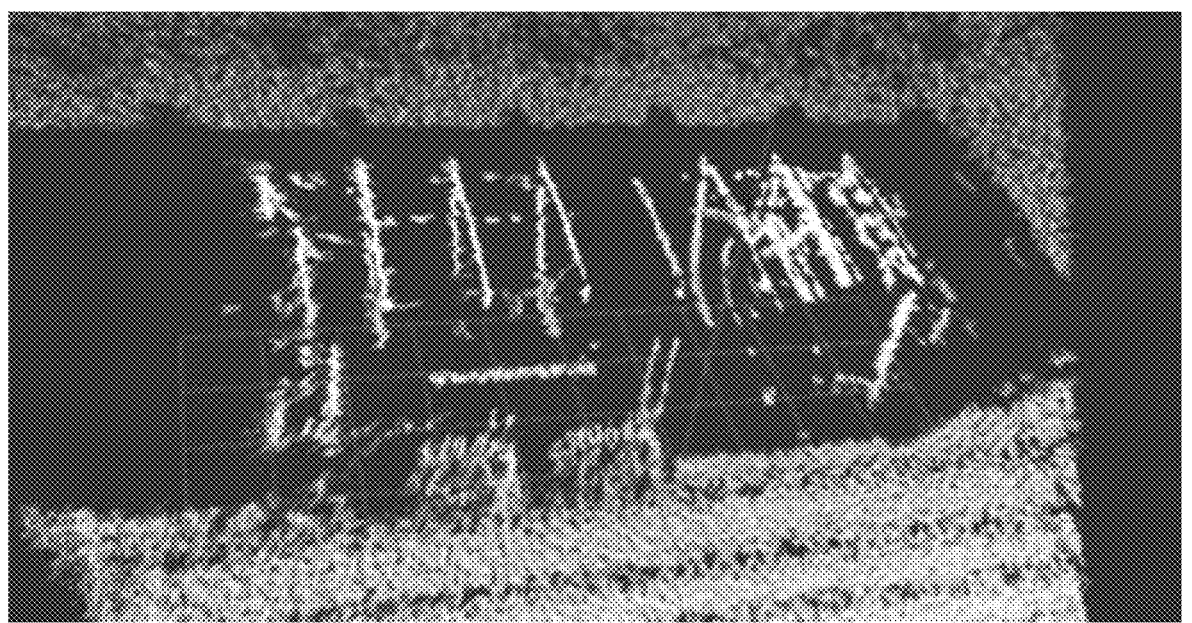
FIG. 16 illustrates a three-dimensional point cloud created using the images of FIG. 15.

FIGS. 15 through 18 illustrate an example of the advantages of separating the cameras 22, 26 along two axes. In FIG. 15, the first camera 22 and the second camera 26 are separated along a single axis 250. A first image 252 is captured by the first camera 22 and a second image 254 is captured by the second camera 26. In this example the cameras 22 and 26 use fisheye lenses therefore the images 252 and 254 present a curved distortion. The system 60 may generate rectified image 256 from original image 252 and rectified image 258 from original image 254. Epipolar lines are generally parallel with horizontal features of the grain cart in the images. When the system 60 generates a three-dimensional representation (in this case a point cloud) of the scene using the two images 256 and 258 some of the horizontal features are missing, as illustrated in FIG. 16 wherein some of the horizontal edges and surfaces of the grain cart (edges and surfaces that are parallel with a longitudinal or lengthwise axis of the cart) are not captured in the point cloud.

Figure 17:
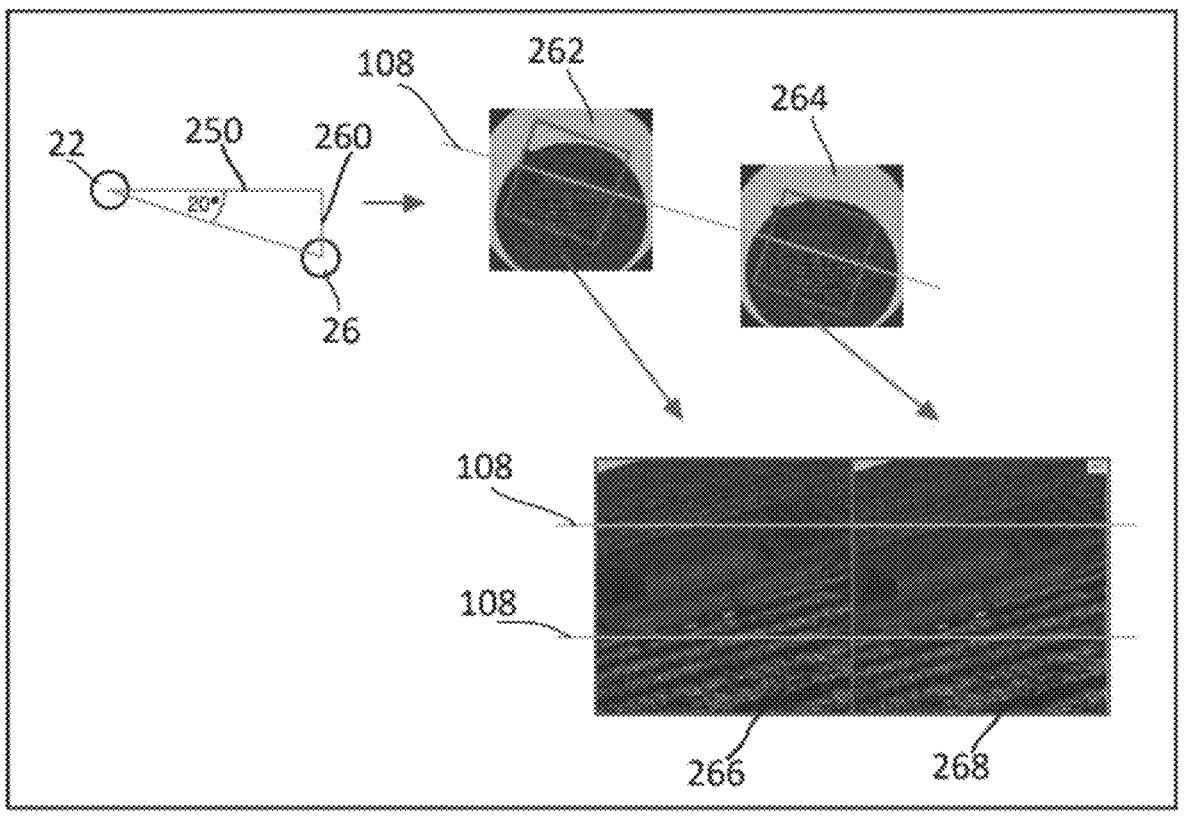
FIG. 17 illustrates images taken from cameras separated along two axes.
Figure 18:
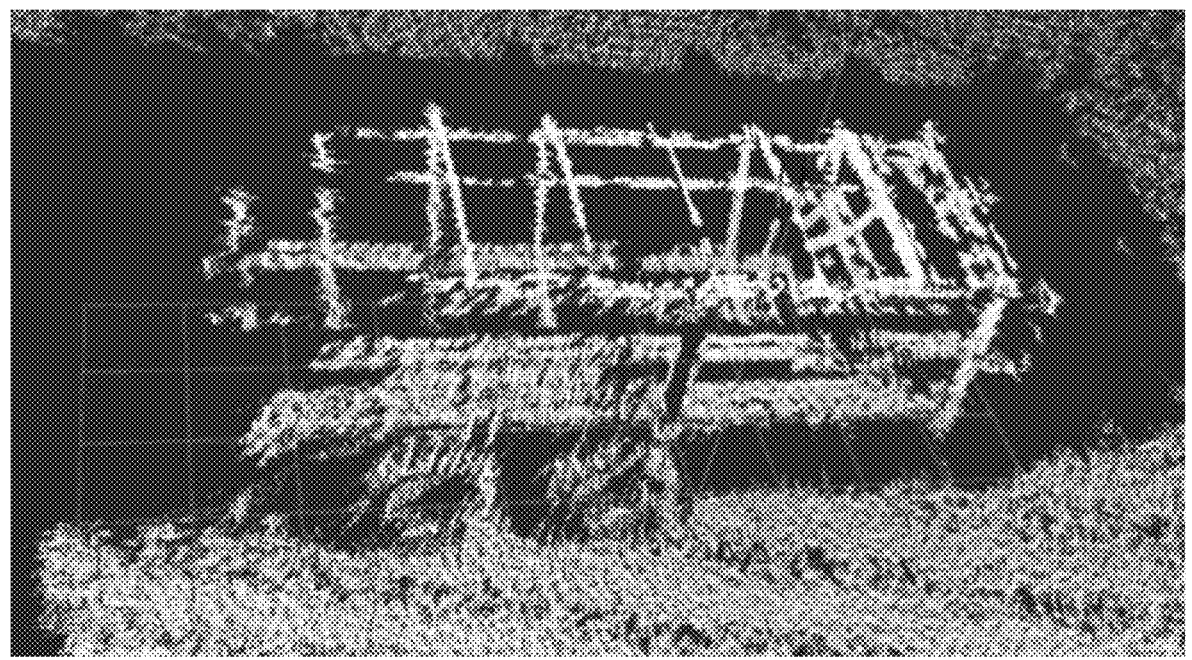
FIG. 18 illustrates a three-dimensional point cloud created using the images of FIG. 17.

In FIG. 17, the same system is used except that the first camera 22 and the second camera 26 are separated along two axes 250 and 260 and positioned such that the cameras form an angle of twenty degrees relative to the first axis 250. The first camera 22 generates first image 262 and the second camera 26 generates second image 264, and the system 60 generates rectified image 266 from original image 262 and rectified image 268 from original image 264. As can be seen, the epipolar lines 108 are not parallel with the horizontal features of the grain cart in the images. In this scenario the three-dimensional representation of the scene includes many more of the horizontal features of the grain cart, as illustrated in FIG. 18.

Although the invention has been described with reference to the preferred embodiment illustrated in the attached drawing figures, it is noted that equivalents may be employed and substitutions made herein without departing from the scope of the invention as recited in the claims. The harvester described and illustrated is a forage harvester, but the present invention may be used with other types of harvesters, including combine harvesters harvesting grain and unloading the grain to grain carts or grain trucks. Furthermore, when reference is made to aligning the crop transfer arm with the receiving vehicle it means positioning the crop transfer arm relative to the receiving vehicle such that crop transferred out of the harvester through the crop transfer arm lands in the receiving vehicle. If the harvester is a forage harvester the crop transfer arm and the receiving vehicle may be separated by a distance of multiple meters as a crop stream exiting the transfer arm follows an arced trajectory toward the receiving vehicle. If the harvester is a combine harvester the transfer arm may need to be directly above a bin of the receiving vehicle as processed crop (grain) will fall directly from the a spout of the transfer arm into the receiving vehicle. Additionally, while the vision system is described as using a software-based clock synchronization protocol, it will be appreciated that a wired or hardware-based synchronization system may also be used. Furthermore, while embodiments of the invention have been described as using fisheye lenses, it will be understood that the invention is not so limited and other types of lenses may be used and are within the ambit of the invention. Additionally, as explained above, in some embodiments the controller 80 uses a software-based clock synchronization protocol to synchronize operation of the first camera 22 and the second camera 26. The invention is not so limited, however, and in other embodiments the controller 80 may use wired connections with the cameras to synchronize their operation.

The claims at the end of this patent application are not intended to be construed under 35 U.S.C. § 112(f) unless traditional means-plus-function language is expressly recited, such as "means for" or "step for" language being explicitly recited in the claim(s).

Having thus described the preferred embodiment of the invention, what is claimed as new and desired to be protected by Letters Patent includes the following:

1. A harvester comprising:
   a crop processor for reducing crop material to processed crop;
   a crop transfer arm for transferring processed crop material to a receiving vehicle;
   a vision system comprising:
      a first camera having a first field of view and positioned on a first side of a crop transfer arm, and
      a second camera having a second field of view and positioned on a second side of the crop transfer arm, the second side being opposite the first side, wherein the first camera is separated from the second camera along two axes; and
   a control system configured to:
      use image data from the first camera and image data from the second camera to detect the presence of the receiving vehicle and to determine a distance between the harvester and the receiving vehicle, and
      generate control signals for automatically aligning the crop transfer arm with the receiving vehicle.

2. The harvester as set forth in claim 1, wherein the first camera is separated from the second camera along two orthogonal axes.

3. The harvester as set forth in claim 1,
   wherein the first camera is separated from the second camera by a distance of at least twenty centimeters.

4. The harvester as set forth in claim 1, further comprising:
   a controller configured to:
   combine image data from the first camera and the second camera to form a single two-dimensional image,
   use the single two-dimensional image to identify the receiving vehicle,
   combine image data from the first camera and the second camera to form a stereo image, and use the stereo image to determine a location of the receiving vehicle relative to the harvester, wherein a first portion of the first field of view overlaps at least a portion of the second field of view and a second portion of the first field of view does not overlap the second field of view, and a first portion of the second field of view overlaps at least a portion of the first field of view and a second portion of the second field of view does not overlap the first field of view.

5. The harvester as set forth in claim 1, the control system further configured to send the control signals to a subsystem of the harvester to align the crop transfer arm with the receiving vehicle.

6. The harvester as set forth in claim 5, the control system configured to send the control signals to a propulsion system of the harvester to adjust a ground speed of the harvester.

7. The harvester as set forth in claim 5, the control system configured to send the control signals to a crop transfer system to adjust operation of the crop transfer arm.

8. The harvester as set forth in claim 1, the control system further configured to communicate the location of the receiving vehicle relative to the harvester to an operator or to a control system of another machine.

9. The harvester as set forth in claim 1, the control system further configured to communicate control commands to the receiving vehicle to cause the receiving vehicle to align with the crop transfer arm of the harvester.

10. The harvester as set forth in claim 1, the first field of view being at least one hundred and forty degrees and the second field of view being at least one hundred and forty degrees.

11. The harvester as set forth in claim 10, the first camera and the second camera being positioned such that a center of the first field of view and a center of the second field of view are angled away from one another by an angle of at least ten degrees.

12. The harvester as set forth in claim 10, the first camera and the second camera being positioned such that a center of the first field of view and a center of the second field of view are angled away from one another by an angle of at least twenty degrees.

13. The harvester as set forth in claim 1, further comprising a mounting assembly movably coupled with the crop transfer arm of the harvester, the first camera and the second camera being mounted on the mounting assembly such that moving the mounting assembly on the crop transfer arm moves the first camera and the second camera relative to the crop transfer arm.

14. The harvester as set forth in claim 13, the mounting assembly being movably attachable to the crop transfer arm at multiple, discrete locations.

15. The harvester as set forth in claim 14, the control system being calibrated to use the vision system at each of the multiple, discrete locations and being configured to automatically detect at which of the multiple, discrete locations the mounting assembly is located.

16. The harvester as set forth in claim 1, the control system implementing a software-based clock synchronization protocol to synchronize the operation of the first camera and the second camera.

17. The harvester as set forth in claim 16, the control system, the first camera and the second camera forming a local area network, the clock synchronization protocol being the precision time protocol according to the IEEE 1588 standard.

* * * * *